July 13, 1954
L. H. MORIN
2,683,572
PLASTIC RIM SPOOL AND THE METHOD OF PRODUCING THE SAME
Filed Feb. 28, 1951
2 Sheets-Sheet 1
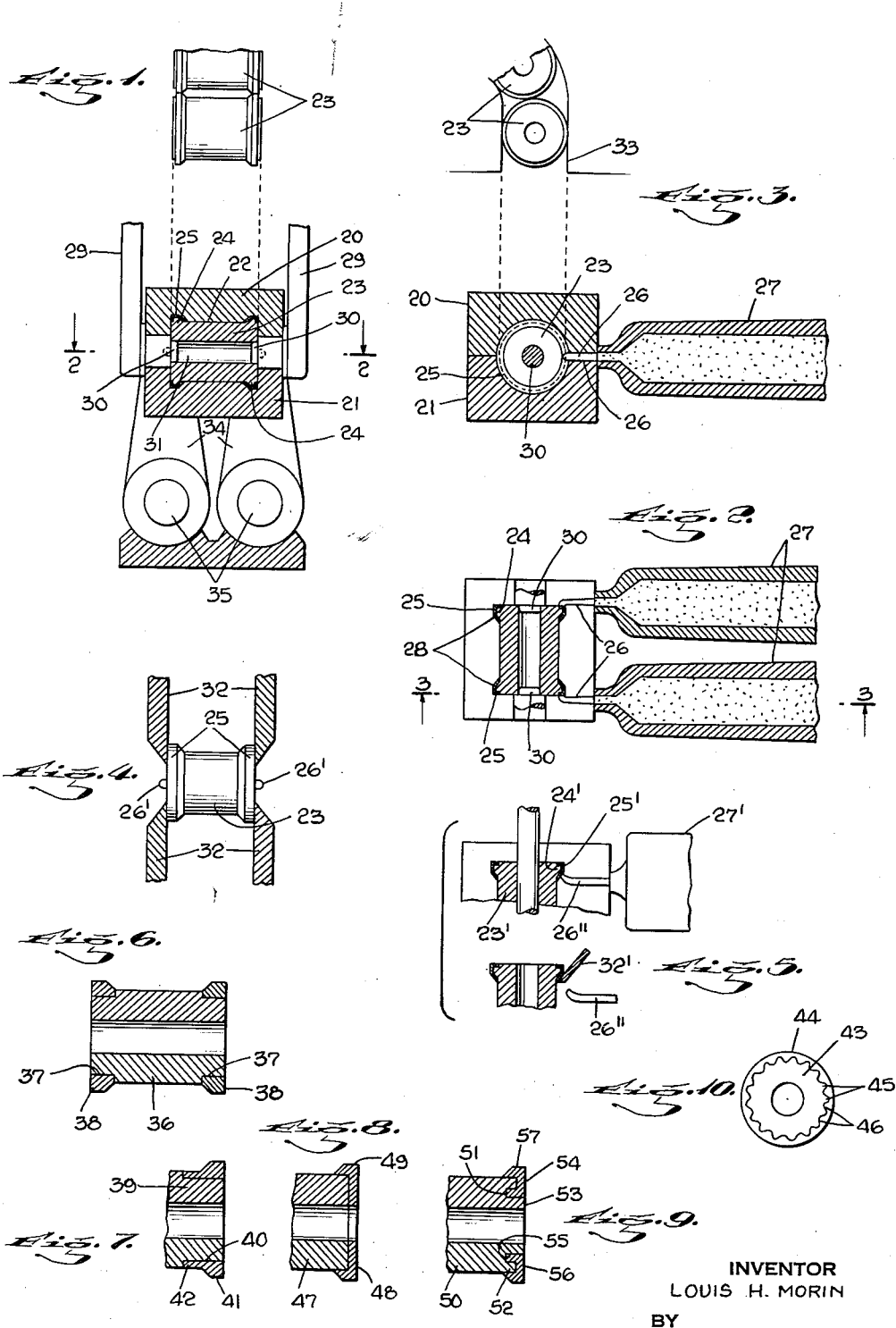
INVENTOR
LOUIS H. MORIN
BY
Howard E. Thompson
ATTORNEY July 13, 1954
L. H. MORIN
2,683,572
PLASTIC RIM SPOOL AND THE METHOD OF PRODUCING THE SAME
Filed Feb. 28, 1951
2 Sheets-Sheet 2
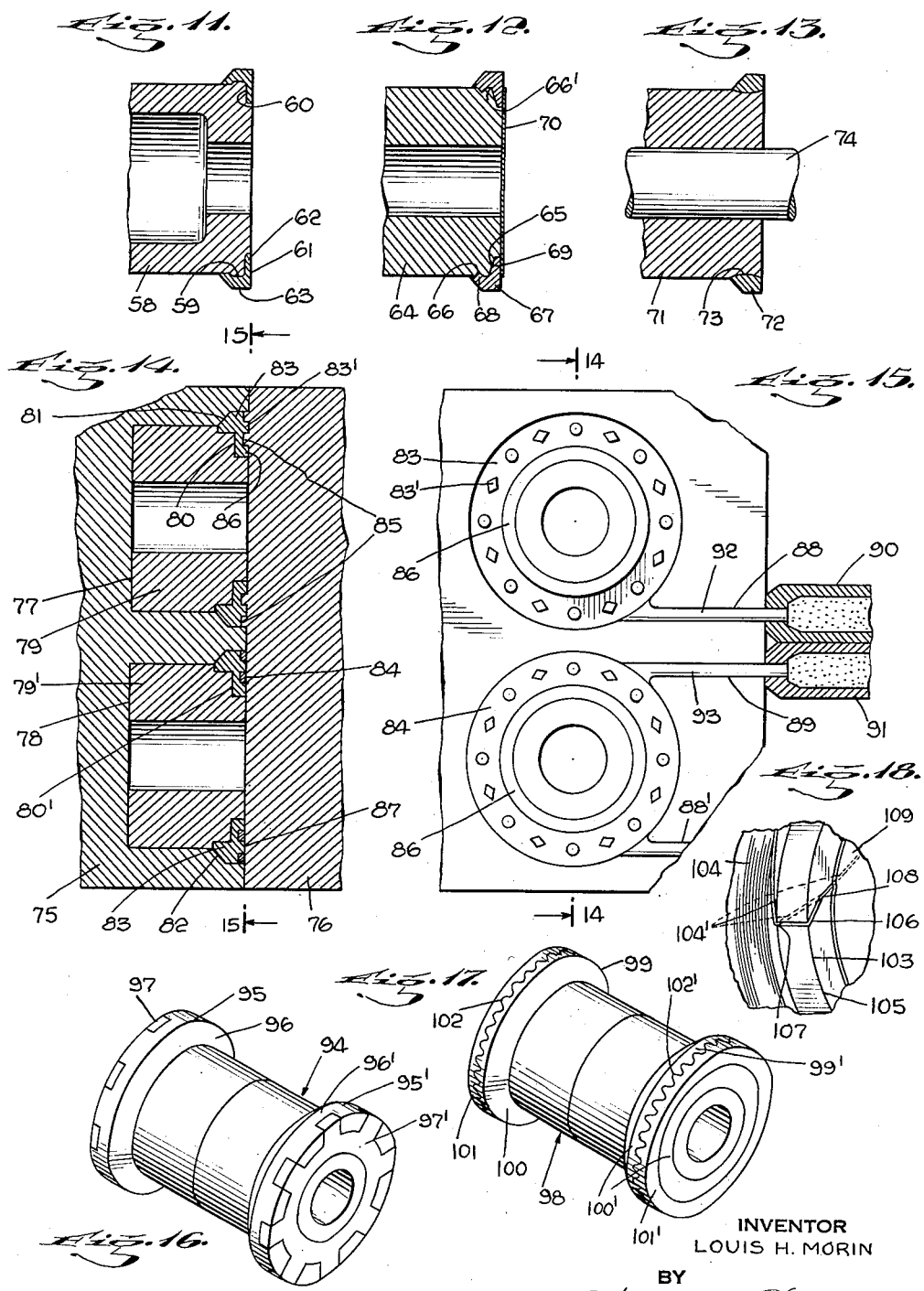
INVENTOR
LOUIS H. MORIN
BY
Howard E Thompson
ATTORNEY Patented July 13, 1954

2,683,572

UNITED STATES PATENT OFFICE 2,683,572

PLASTIC RIM SPOOL AND THE METHOD OF PRODUCING THE SAME

Louis H. Morin, Bronx, N. Y., assignor to Coats & Clark Inc., a corporation of Delaware Application February 28, 1951, Serial No. 213,123

19 Claims. (Cl. 242—118)

1

This invention relates to the production of spools on which thread and other strands are wound. The invention also deals with spools of the character described, wherein the body portion of the spool is composed of wood, wood compositions and other fibrous material. The body portion has, at end portions thereof, means for receiving die cast rims for reinforcing and finishing the spool ends and to adapt these ends for provision of a non-chippable thread or strand nick for retaining the thread or strand end in position. More particularly, the invention deals with a method of forming plastic rim ends on spool bodies of the kind under consideration, wherein each rim may be separately formed and, wherein, both rims may be simultaneously formed on a spool body.

Still more particularly, the invention deals with a method of forming plastic rims of contrasting colors and designs.

The novel features of the invention will be best understood from the following description, when taken together with the accompanying drawings, in which certain embodiments of the invention are disclosed and, in which, the separate parts are designated by suitable reference characters in each of the views and, in which:

Fig. 1 is a diagrammatic showing of one method of forming rims on spool bodies, part of the construction being shown in section.

Fig. 2 is a section on the line 2—2 of Fig. 1, omitting parts of the construction.

Fig. 3 is a sectional view substantially on the line 3—3 of Fig. 2.

Fig. 4 is a diagrammatic sectional view illustrating the step of trimming the gate portions from the rims of a spool formed as in Figs. 1 to 3, inclusive.

Fig. 5 shows a diagrammatic sectional view illustrating the formation of a single rim on one end of a spool body and the trimming of such rim.

Fig. 6 is a longitudinal sectional view through a spool showing another form of rim construction.

Figs. 7, 8 and 9 are views similar to Fig. 6 showing only part of the construction and showing modifications.

Fig. 10 is an end view of a spool which might be similar to the spools shown in Figs. 6 and 7 illustrating the formation of a tooth engagement between the rims and the spool body.

Figs. 11 to 13, inclusive, are views similar to Figs. 7 and 8 showing other forms of spools and rims thereon.

2

Fig. 14 is a diagrammatic sectional view through two die parts illustrating the method of forming two color plastic rims, the section being substantially on the line 14—14 of Fig. 15.

Fig. 15 is a section substantially on the line 15—15 of Fig. 14 diagrammatically showing the formation of the two color rims.

Figs. 16 and 17 are perspective views of other forms of two color spool rims which may be employed and formed in accordance with the teachings in Figs. 14 and 15; and Fig. 18 is an enlarged perspective view of one portion of any one of the rims of the spools illustrated in the several figures, showing the arrangement of the thread or strand receiving nick therein and indicating a strand disposed in said nick.

In the use of spools of the type and kind under consideration, which are generally formed of wood, difficulty has been experienced in the disfiguration of the flanged or rimmed ends of the spool and, particularly, in the breaking of the slit, or nick, portion in the rim for reception of the thread or strand end.

It is the purpose of my invention to provide the ends of spools of the kind under consideration with what I term "plastic rims" which are die cast directly upon the spool ends, thus reinforcing, as well as producing a neat and finished appearance to the spool ends and, at the same time, providing a slit or nick portion which will be substantially non-chippable or breakable, thus insuring anchorage of the thread or strand end in the sale of the spool, as well as in the continued use thereof.

Generally speaking, my invention deals with the application of a plastic material when reduced to a heated or flowable state to a spool end and in adhering the plastic to the spool end by shrinkage of the material on the spool end in retaining the same against displacement therefrom.

In the accompanying drawing I have illustrated diagrammatically a few methods of forming the plastic rims and, further, in forming the spool body for reception of these rims.

In Figs. 1 to 4, inclusive, I have illustrated diagrammatically one method of forming plastic rims simultaneously on both ends of a spool body. In Fig. 1, 20, 21 represent a pair of dies collectively forming a cavity 22 for the reception of a spool body 23. The spool body 23 has recessed end flanges 24, upon which plastic rims 25 are adapted to be formed in the manner clearly illustrated in Figs. 1, 2 and 3 of the drawing. The dies 20 and 21 have, on their parting line, gate passages 26, with which two injection nozzles 27 register, note Fig. 2, and these nozzles are adapted to simultaneously inject into the cavities 28 of the dies plastic material which will result in the formation of the rims 25.

Also disposed on the parting line of the dies are a pair of grippers 29, having pin portions 30 which enter the core 31 of the spool body and these grippers may be utilized to deliver the spool with the cast rims thereon to a trimming station, as diagrammatically seen in Fig. 4 of the drawing, at which station, the gates 26' formed by the gate passages 26 will be trimmed by pairs of trimming tools 32, after which, the spool is ready for the slitting or nicking operation to produce a slit or nick, as later described in conjunction with Fig. 18. The spool bodies 23 may be delivered from a suitable hopper feed, indicated in part at 33 in Fig. 3 of the drawing into position between the dies 20, 21, when open, by the grippers 29.

Fig. 1 illustrates at 34 a pair of arms, pivoted as seen at 35, for supporting and actuating the injection cylinders 27 so as to shear the gate from the discharge end of the cylinders, as is known in the art.

In Fig. 5 of the drawing, I have shown a slight modification of the method illustrated in Figs. 1 to 4, inclusive, wherein a single rim 25' may be die cast directly upon the flange end 24' of a spool body 23'. In other words, a single injection cylinder 27' will be employed and, with this construction, the gate portion 26'' of the rim 25' can extend to the rim in the manner illustrated in the upper figure and trimmed by a trimming tool 32', in a manner shown in the lower figure. The method, as seen in Fig. 5, can be utilized in individually forming the end rims on a one-piece spool body, or, it may be utilized in forming rims on spool bodies that are composed of separate parts which are later secured together.

With the construction shown in Figs. 1 to 5, inclusive, the spool body includes a more or less standard type of flange end, modified solely for the reception of the rim, so that the resulting spool will have ends, substantially similar to the standard type of spool. Instead of using spools of this type and kind, it will be apparent that the spool body may be shaped or moulded in a modified form and plastic rims formed thereon to produce substantially the same general contour, as spools of the standard type. In Figs. 6 to 13, inclusive, I have shown a few different types of spool body and rim constructions; whereas, in Figs. 14 to 17, inclusive, I have shown further adaptations of my invention in production of two color plastic rims to provide design or other characteristics to the finished spool.

In Fig. 6 of the drawing, a spool body 36 is shown having, at its ends, reduced diameter extensions 37, upon which plastic rims 38 are formed and here the rims will produce a finished contour of the spool. With this type of construction, the cost of production of the initial spool body is reduced to a substantial degree.

In Fig. 7, I have shown at 39 one end of a spool body which differs from the body shown in Fig. 6 simply in enlarging upon the length of the reduced portion 40, so that the resulting plastic rim 41 includes an integral annular ring portion 42 which is flush with the outside diameter of the central portion of the spool body 39.

Turning now to Fig. 10 of the drawing, here is illustrated an end view of a spool, wherein the body is designated by the reference character 43 and this body might be identical to the bodies 36 and 39 of Figs. 6 and 7 and 44 might comprise a rim, similar to the rims 38 and 41. The difference in Fig. 10 consists in providing, on the reduced end extensions of the spool, circumferentially spaced teeth 45 and the rim will have corresponding teeth 46 fitting in the recess between the teeth 45. This construction provides a definite keying of the rim to the spool body, as well as producing an attractive design on the spool ends.

In Fig. 8 of the drawing, I have shown a spool body 47 in the form of a cylinder and at 48 is illustrated a die cast cap end, which finishes the entire end of the spool, the cap end having an integral flange or rim portion 49.

In Fig. 9, I have shown at 50 another cylindrical spool body, the end wall of which is milled or moulded to form a circumferential groove 51, around which is an annular ring portion 52, which sets inwardly of the spool end, which is designated at 53. With this construction, a plastic ring-like member 54 is cast upon the spool end, the ring having a circumferential portion 55 filling the groove 51 and a surface portion 56 arranged outwardly of the ring portion 52 and being flush with the spool end 53. The ring-like member 54 also includes an annular flange or rim portion 57, similar to the rim 49.

In Fig. 11 of the drawing, I have shown at 58 a moulded spool body, ends of which are formed with a circumferential extending enlargement 59 and an annular recess 60 adjacent the enlargement. With this construction, a ring-like rim 61 is cast upon the spool end and includes a facing portion 62 which fills the groove or recess 60 and a flange or rim portion 63 which encircles and envelopes the enlargement 59, thus providing definite means of keying the ring-like rim 61 to the spool end.

In Fig. 12 of the drawing, I have shown a substantially cylindrical spool body 64 having its ends turned to form a bevelled wall recess 65 on the outer surface thereof, inwardly of which the periphery of the body 64 has an annular groove 66 which forms a resulting annular portion 66'. At 67 is shown a die cast rim which extends beyond the diameter of the body 64 and includes a part 68 filling the groove 66 to key the rim on the spool body and an annular portion 69 filling the recess 65 and being flush with the spool end. In this figure, I have indicated at 70 a label fixed to the end of the spool, as is customary with spools of the kind under consideration and this label may overlie the attached rim in the manner indicated or may terminate flush with the small diameter of the annular portion 69, as will be apparent. At this time, it will also be well to state that, with most of the structures shown, this label strip is applied. However, in some forms of construction, the casting itself may be utilized to include the trade-marking, or labeling, of the spool, as well as to give design thereto, as later described in connection with Figs. 14 to 17, inclusive, or on devices such as shown in Figs. 8 and 9 of the drawing.

In Fig. 13, I have shown a cylindrical spool body 71 with a rim portion 72 formed on the periphery of the outer extremity of the spool body, wherein by the use of a sufficient injection pressure on a relatively or comparatively soft spool body an indenture or depression 73 is formed. With this procedure, a supporting core 74 is used to sustain the body 71 against the force of the injected material, thus establishing, in addition to the normal adhesion of the cast rim, a depression which provides anchorage or keying means. By reason of the simplicity of the spool body 71, the method of producing the same will be very economical. In this connection, the structure of Fig. 8 is also an economical structure.

In Figs. 14 and 15, I have shown a method of forming rim ends on spools or spool halves in different colored plastics, thus facilitating the formation of attractive designs or ornamentations on the spool ends, as well as to characterize the spool ends with trade names or trade-marks and other symbols of identification of the product. In this connection, it might be well to mention that, in the several forms of die cast rims disclosed, the color of the rim may be characteristic of the color of the product wound upon the spool body, or may be in contrast therewith to offset the color of the product.

In Fig. 14, I have diagrammatically shown two die parts 75, 76, the part 75 having a pair of cavities 77 and 78 for reception of half spool bodies 79, 79', these bodies being of identical construction and are formed at their ends with grooves or recesses, as indicated at 80, 80'. The cavities 77 and 78 have portions 81, 82 to form on the bodies 79, 79' the resulting rims which comprise two parts 83, 84. The part 83 is formed in the cavity portion 81, whereas the part 84 is formed in the cavity portion 82 upon the part 83 disposed therein. The die 76 has a cavity forming portion 85 which extends into the cavity 81 and forms, on the surface of the rim part 83, a plurality of characterizing elements 83', as well as an annular ring portion 86 both of which will be flush with the outer surface of the rim part 84 on the finished product.

The lower part of the die 76 which registers with the cavity 82 and the rim part 83 disposed therein is straight, as indicated at 87 or, in other words, does not include the portions 85, so that, in injecting the casting material into the cavity 82, the rim part 84 will have a flush outer surface with the outer surfaces of the parts 83' and 86 as well as the outer large diameter of the part 83, as will appear from a consideration of the lower portion of Fig. 14.

On the parting line of the dies 75 and 76 are three gate passages 88, 89 and 88' and a pair of injection nozzles are indicated at 90 and 91. These nozzles are adapted to simultaneously inject plastic material into both cavities 81, 82, the nozzle 90 containing one color plastic, and the nozzle 91 containing a plastic of a contrasting color.

After forming the cast part 83, this part, together with its spool body 79, is moved into the position indicated at 79' or, in other words, into the cavity 78 by suitable means, not shown, and another spool body 79 is placed in the cavity 77. Then on the next charge of both nozzles 90, 91 a finished product will be produced in the cavity 78 and a rim part 83 will be formed on a spool body in the cavity 77 and this operation will continue and, in each injection charge, a completely finished product will be formed. It will be understood that the gate portion 92 of the part 83 will fit in the gate 88' when the part 83 is disposed in the lower cavity 78. This gate portion, as well as the gate portion 93, are trimmed off by suitable trimming tools, thus producing a finished spool half and two of these halves may be adhesively or otherwise secured together to form the finished spool.

In Fig. 16, I have shown at 94 a spool produced in the manner illustrated in Figs. 14 and 15, that is to say, having flanged ends 95, 95' formed from two color plastics 96, 96' representing a portion, similar to the portion 83; whereas, 97, 97' represents a portion, similar to the portion 84. In other words, in Fig. 16, the portions 96, 96' extend to the outer surface of the rims at the periphery thereof which is not the case in the structure shown in Figs. 14 and 15.

In Fig. 17 is shown at 98 another type of spool, wherein the flanged ends 99, 99' have portions 100, 100' and portions 101, 101', again generally similar to the portions 83, 84. However, in Fig. 17, the portions 100, 101; 100', 101' have intermeshing teeth portions near the periphery thereof, as indicated at 102, 102'.

In Fig. 18 of the drawing, I have shown a perspective edge view of the flange end of a spool body which can represent any one of the spool bodies shown in the other figures and, in said figure, 103 represents the flange end and 104 represents the thread or strand mounted upon the spool body. The outer peripheral corner portion 105 of the rim 103 is provided with a cut or nick, as indicated at 106, this nick or cut being angularly arranged and opens through the periphery of the rim 103, as seen at 107, and through the face of the rim, as seen at 108. It will thus be seen that the free end 104' of the thread or strand is placed in the cut or nick 106 and extends to the outer surface of the spool and, in initially packing, the end of the strand can be sealed or covered by the label portion 109, as is the usual practice.

By employing the plastic rims, a cut or nick portion for securing the thread end is provided which will be considerably stronger than the cutting or nicking of a wood spool which is susceptible to breakage. The plastic nick can be re-used from time to time as the thread of the spool is consumed without danger of breakage. In addition to providing the more secure mounting of the thread or strand end, spool ends of neater and more finished appearance are provided and, further, spool ends which lend themselves to secondary uses, namely for decorative purposes, or for purposes of applying trade names or other markings thereon.

The spool bodies are formed from wood or wood pulp compositions, or from any type or kind of fibrous material which can be moulded or pressed to the desired form. Spools may also be formed from moulding compositions having a paper, textile, stone or other inorganic type filler. Spools made by conventional fabricating methods, rather than by moulding, are suitable and may be made of wood, metal, paper, or ceramic material. When the spool body is relatively soft, the injection pressure, together with the shrinkage, produces an inward radial pressure of the rim on the spool body to securely retain the rim against displacement.

In some instances, the spool body has, at its end, a circumferential part, such for example, as the annular flange or an annular portion, such as the portion 66' of Fig. 12. These flanges or annular portions form recesses inwardly thereof, into which part of the plastic rim extends in retaining the rim against displacement from the spool body.

In referring to the plastic materials, it will be understood that reference is made to the thermoplastic materials which are capable of being used in injection moulding machines. It will also be understood that the notching or nicking of the rims can take place at any time and is usually performed after the thread has been wound on the spool, so that the position of the nick can be controlled with respect to the thread end.

Having fully described my invention, what I claim as new and desire to secure by Letters Patent is:

1. A spool comprising a barrel portion of chippable material having an annular plastic rim around at least one end portion of the same, said rim having an annular part extending inwardly of said end portion, said part having outer surfaces which are flush with the outer surfaces of said barrel portion, and said rim having a shrink fit on said end portion, said shrink fit being produced by die casting the rim on said end portion.

2. A spool comprising a barrel portion of chippable material having an annular plastic rim around at least one end portion of the same, said plastic him having an annular part extending over the outer surface of the barrel portion in the vicinity of said end portion, said rim having another annular part which extends onto said end face, and said rim having a shrink fit on said end portion, said shrink fit being produced by die casting the rim on said end portion.

3. A spool comprising a barrel portion having an annular plastic rim around at least one end portion of the same, an annular groove in the end face of said end portion, said plastic rim having a first annular part extending into said groove, said rim having a second annular part extending over the outer surface of the barrel portion in the vicinity of said end portion, said rim having a third annular part which extends onto said end face and which joins said first and second parts, and said rim having a shrink fit on said end portion, said shrink fit being produced by die casting the rim on said end portion.

4. A spool comprising a barrel portion of relatively compressible material having an annular plastic rim around at least one end portion of the same, said rim compressively engaging said end portion so as to circumferentially indent said end portion, said rim being keyed against longitudinal movement relatively to said barrel portion by virtue of its compressive indenting engagement therewith, said rim having a shrink fit on said end portion, said shrink fit being produced by die casting the rim on said end portion.

5. The method of producing a rimmed spool body which comprises supporting at least one end portion of a spool body of relatively compressible material within the cavity of a pair of mating dies, pressure injecting molten plastic material into said cavity and around said end portion to form a plactic rim thereon, and injecting said molten plastic material at a pressure sufficiently high to enable said rim to circumferentially indent said end portion of the spool body, thereby producing a spool body having a plastic rim keyed thereto.

6. The method of producing a rimmed article which comprises supporting at least one end portion of an unrimmed article of relatively compressible material within the cavity of a pair of mating dies, pressure injecting molten plastic material into said cavity and around said end portion to form a plastic rim thereon, and injecting said molten plastic material at a pressure sufficiently high to enable said rim to circumferentially indent said end portion, thereby producing a rimmed article having a plastic rim keyed thereto.

7. A spool of the character described comprising a hollow spool body of chippable material, one end of said body having a solid non-chippable plastic rim thereon, said rim being die cast in place on said end, and a part of the rim being exposed at said end of the body.

8. A spool of the character described comprising a hollow spool body of chippable material, one end of said body having a solid non-chippable plastic rim thereon, said rim being die cast in place on said end, and a part of the rim being exposed at said end of the body, and interlocking means on the body and rim for keying the same against relative movement.

9. A spool of the character described comprising a hollow spool body of material having a tendency to chip, one end of said body having a plastic rim thereon resistant to chipping, said rim being die cast in place on said end, a part of the rim being exposed at said end of the body, and interlocking means on the body and rim for keying the same against relative circumferential movement.

10. A spool of the character described comprising a hollow spool body of material having a tendency to chip, one end of said body having a plastic rim thereon resistant to chipping, said rim being die cast in place on said end, and said rim comprising separate parts of different colors.

11. A rimmed article of the class described comprising a body part of fibrous material, a circumferential, solid, non-chippable, plastic rim at one end of the body part, the juncture between the rim and the body part being characterized by a flowed-in adhesion of the rim to the body part, said flowed-in adhering rim being produced by die casting the rim around the body part.

12. A rimmed article of the class described comprising a body part of fibrous material, a circumferential, solid, non-chippable plastic rim at one end of the body part, said rim being bonded to said body part by inward radial pressure, said bond being produced by die casting the rim on the body part, and said rim comprising two interfitting portions.

13. A rimmed article of the class described comprising a body part having at one end portion thereof a circumferentially continuous integral portion, a recess inwardly of said circumferentially continuous portion, a plastic rim on said circumferentially continuous portion and extending into said recess to retain the rim against displacement from said body part, the juncture between the rim and the body part being characterized by a flowed-in adhesion of the rim to the body part, and said flowed-in adhering rim being produced by die casting the rim around the body part.

14. A spool of the class described comprising a spool body of chippable material, an annular solid non-chippable plastic body around one end of said spool body to form a rim thereon, said rim being bonded under inward radial pressure to said body and having a shrink fit on said end, said bond being produced by die casting the rim on the body, and a non-chippable thread-holding nick in said plastic rim.

15. A spool of the class described comprising a spool body of chippable material, an annular solid non-chippable plastic body around one end of said spool body to form a rim thereon, said rim having a shrink fit on said end produced by die casting the rim on the end, said spool body and rim having interfitting portions retaining the rim against movement on said body, and a non-chippable thread-holding nick in said plastic rim.

16. A flanged thread spool of wood having an annular plastic rim around at least one end thereof, said rim being die cast on said end and a non-chippable thread nick in said rim.

17. A flanged thread spool material having a tendency to chip, said spool having an annular, non-chippable, solid plastic rim around at least one end portion thereof, said rim having a shrink fit on the spool, and said shrink fit being produced by die casting the rim on said spool.

18. A rimmed article of the class described, said article comprising a body part, a circumferential rim at one end of the body part, said rim comprising a plastic member die cast directly on the body part, said body part having circumferentially spaced projections, and said member having portions interfitting the projections to key the member against relative rotation about said body part.

19. A rimmed article of the class described, said article comprising a body part, an annular plastic rim around one end portion of the body part, said end portion having an annular recess and said rim extending into said recess, said rim having a shrink fit on said end, said shrink fit being produced by die casting the rim on said end portion, and a non-chippable thread-holding nick in said plastic rim.

References Cited in the file of this patent

UNITED STATES PATENTS

| Number | Name | Date |
|---|---|---|
| 1,770,388 | Bishop | July 15, 1930 |
| 1,981,771 | Benge | Nov. 20, 1934 |
| 2,086,939 | Hess | July 13, 1937 |
| 2,190,085 | Scholl | Feb. 13, 1940 |
| 2,264,116 | Howsam | Nov. 25, 1941 |
| 2,266,129 | Tegarty | Dec. 16, 1941 |
| 2,304,461 | Knowles | Dec. 8, 1942 |
| 2,344,665 | Adams | Mar. 21, 1944 |
| 2,370,699 | Warren | Mar. 6, 1945 |
| 2,453,247 | Moss | Nov. 9, 1948 |
| 2,470,089 | Booth | May 17, 1949 |

FOREIGN PATENTS

| Number | Country | Date |
|---|---|---|
| 1,173 | Great Britain | of 1852 |
| 598 | Great Britain | of 1859 |